United States Patent
Moody

[11] Patent Number: 5,927,149
[45] Date of Patent: *Jul. 27, 1999

[54] HIGH-TORQUE QUIET GEAR

[75] Inventor: Paul E. Moody, Barrington, R.I.

[73] Assignee: The United States of America as represented by the Secretary of the Navy, Washington, D.C.

[*] Notice: Under 35 U.S.C. 154(b), the term of this patent shall be extended for 656 days.

[21] Appl. No.: 08/502,408

[22] Filed: Jul. 14, 1995

[51] Int. Cl.$^6$ .................................................. F16H 55/14
[52] U.S. Cl. .......................... 74/443; 74/574; 74/594.1; 464/89
[58] Field of Search ....................... 74/443, 574, 594.1; 464/75, 82, 87, 89

[56] References Cited

U.S. PATENT DOCUMENTS

| 1,785,812 | 12/1930 | Gribben | 74/443 |
| 3,541,873 | 11/1970 | Wolf et al. | 74/443 |
| 4,078,445 | 3/1978 | Kiser, Jr. | 74/443 |
| 5,452,622 | 9/1995 | Fenelon | 74/443 |

FOREIGN PATENT DOCUMENTS

| 979541 | 1/1965 | United Kingdom | 74/443 |

Primary Examiner—John A. Jeffery
Assistant Examiner—David Fenstermacher
Attorney, Agent, or Firm—Michael J. McGowan; Prithvi C. Lall; James M. Kasischke

[57] ABSTRACT

A high-torque quiet gear construction consists of an inner hub having a plurality of circumferentially spaced arms extending radially outwardly therefrom, and an outer ring member having a plurality of circumferentially spaced teeth extending radially inwardly therefrom. The ring member further includes a plurality of gear formations on an outer surface thereof for intermeshing with other gears. The teeth of the ring member are received in spaced relation in corresponding spaces formed between adjacent arms of the hub. An elastomeric member is received in the space formed between the hub and the ring member to form a resilient correction between the arms of the hub and the teeth of the ring member. The side surfaces of the arms and the teeth extend generally parallel to each other and at least partially overlap in a longitudinal direction. The purpose of this configuration is to place the elastomeric member in compression when torque is applied to the hub. Since elastomeric material is relatively incompressible, the result is low shear loads on the adhesive bonds which hold the elastomeric member to both the hub and outer ring member.

3 Claims, 1 Drawing Sheet

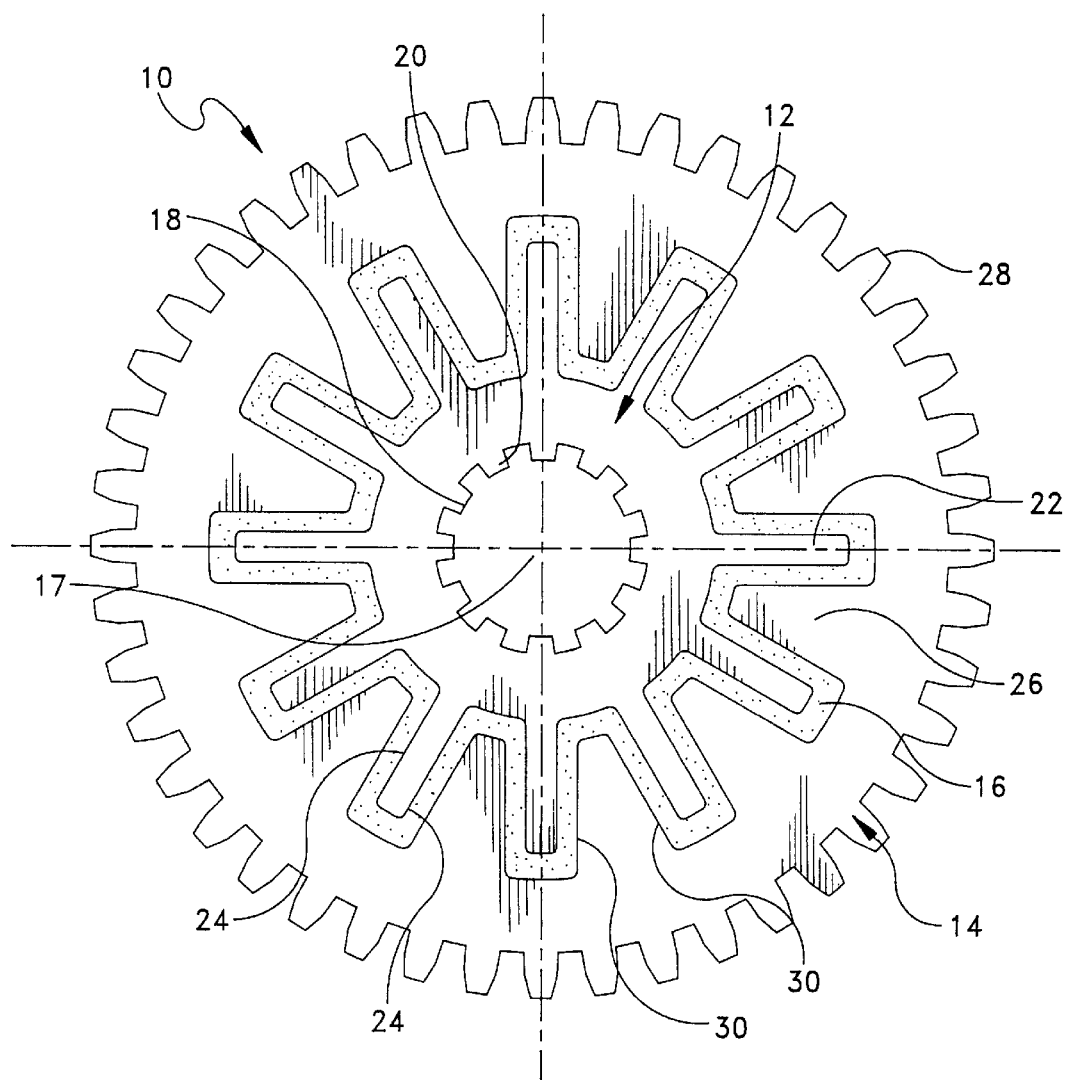

HIGH-TORQUE QUIET GEAR

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The instant invention relates to gear train systems, and more particularly to a high-torque quiet gear for quieting gear train noise over a wide range of applications.

2. Description of the Prior Art

Existing gear trains produce harmonic vibrations which results from the meshing and releasing of gears as they rotate. This vibration frequently produces structural and airborne noise levels which are unacceptable.

Gear noise is presently controlled by designing a gear train system which minimizes the backlash between meshing teeth of a gear train. In addition, various gear teeth configurations have been developed to ensure that more than one tooth is engaged at all times. Close tolerance machining of parts, closely controlling the center to center location of meshing gears, selecting proper materials, controlling system speed of operation, insuring proper system lubrication, limiting piece part loads and isolation of the entire system can also be used to quiet a system.

Another known method of reducing gear backlash is the provision of elastomeric members inserted between the drive shaft and the gear to reduce the transmission of vibration and noise from the drive shaft to the gear or vice-versa. In this regard, the U.S. Patent to Knapp et al., U.S. Pat. No. 4,269,262 is representative of the state of the prior art. The patent to Knapp et al. discloses a gear structure comprising a cylindrical core, an annular ring gear and an elastomeric cushion positioned between the core and the ring gear. Inwardly and outwardly radially projecting portions of the elastomeric cushion are respectively bonded, usually with an adhesive, to the exterior surface of the core and the interior surface of the ring gear.

In general, these types of gear configurations have been found to reduce vibration and noise transmitted from the drive shaft to the gear. However, the gear configurations have a distinct disadvantage in that the bonded area of the elastomer is subjected to high shear forces when torque is transmitted through the system. It has been found that upon repeated use, the bonded surface is highly susceptible to failure, and is the weak link in a multiple piece gear system.

While all of these techniques are partially successful in reducing vibration and noise, they often require expensive manufacturing techniques, and even when combined, have not been found to be fully effective.

It is unlikely that vibrations due to meshing gears can ever be reduced to an undetectable level. The previously noted techniques are all appropriate and applicable, depending on the application and levels of quieting desired for the system being developed. The invention proposed herein is not intended as a complete replacement for these techniques, but rather it is intended to act as a supplement which can be used in conjunction with any of these techniques.

SUMMARY OF THE INVENTION

Accordingly, among the many objectives of the invention are: the provision of a quiet gear which is effective in high torque applications; the provision of a quiet gear construction having an elastomeric material disposed between the inner hub and the outer ring for reducing the transmission of vibration and noise between the hub and the outer ring; the provision of a quiet gear construction wherein the elastomeric member is placed in compression to reduce shear forces on the bonds between the elastomeric member and the hub and outer ring. The instant invention provides a high-torque quiet gear construction comprising an inner hub having a plurality of circumferentially spaced arms extending radially outwardly therefrom, and an outer ring member having a plurality of circumferentially spaced teeth extending radially inwardly therefrom, and further having a plurality of gear formations on the outer surface thereof. The inwardly radiating teeth of the ring member are received in spaced relation in corresponding spaces formed between adjacent arms of the hub. An elastomeric member is received in and fills the space formed between the inner hub and the outer ring member to form a resilient connection between the arms of the hub and the teeth of the ring member. The side surfaces of the arms and the teeth extend generally parallel to each other and at least partially overlap in a longitudinal direction. The purpose of this configuration is to place the elastomeric member in compression when torque is applied to the hub. Since elastomeric material is relatively incompressible, the result is low shear loads on the adhesive bonds which hold the elastomeric member to both the inner hub and outer ring member.

Other objects, features and advantages of the invention shall become apparent as the description thereof proceeds when considered in connection with the accompanying illustrative drawings.

BRIEF DESCRIPTION OF THE DRAWINGS

A more complete understanding of the invention and many of the attendant advantages thereto will be readily appreciated as the same becomes better understood by reference to the following detailed description when considered in conjunction with the sole accompany drawing which shows an elevational view of the high torque quiet gear construction of the instant invention.

DESCRIPTION OF THE PREFERRED EMBODIMENT

Referring now to the sole drawing, the high-torque quiet gear construction of the instant invention is illustrated and generally indicated at 10 in the drawing. As will hereinafter be more fully described, the quiet gear construction 10 effectively reduces the transmission of vibration and noise through a gear system.

The gear construction 10 comprises an inner hub generally indicated at 12, an outer ring member generally indicated at 14, and an elastomeric member generally indicated at 16 disposed between the hub 12 and ring member 14.

The inner hub 12 has an axis of rotation 17, and can be driven about the axis 17 by many known techniques. However, for purposes of illustrating a preferred embodiment, the hub 12 includes an axial bore 18 with inwardly extending spline teeth 20 for insertion of an axial drive shaft (not shown). The hub 12 further includes a plurality of circumferentially spaced arms 22 which extend radially outwardly therefrom. The arms 22 are preferably rectangular in configuration and have opposing side surfaces 24.

The ring member 14 includes a plurality of circumferentially spaced teeth 26 which extend radially inwardly therefrom, and further includes a plurality of outwardly extending gear formations 28 for intermeshing with other gears (not shown). The instant illustrations specifically show a spur gear configuration; however, it is to be understood that the concept is applicable to any gear tooth configuration. The ring member 14 and hub 12 are received in assembled relation wherein the teeth 26 of the ring member 14 are received in closely spaced relation in corresponding spaces formed between the arms 22 of the hub 12. In this connection, it is noted that the teeth 26 are formed with an outwardly tapered configuration so that the side surfaces 30 of the teeth are positioned in generally parallel relation to the side surfaces 24 of the arms 22. It is further pointed out that the teeth 26 and arms 22 at least partially overlap, or intermesh, in the longitudinal direction.

The elastomeric member 16 is received in the space formed by the spaced hub 12 and ring member 14 so as to from a resilient connection between the hub 12 and the ring member 14. The elastomeric member 16 may comprise any suitable elastomeric material such as natural or synthetic rubber or the like which is relatively incompressible. The elastomeric member 16 is preferably bonded to the hub 12 and ring gear 14 by a suitable adhesive (not shown) which is effective for establishing a secure bond between the elastomeric material and the material of the hub 12 and ring member 14. In most instances the hub 12 and ring member 14 are constructed from metallic materials, although other rigid plastics and synthetic materials are also contemplated With the present gear construction 10, any vibration caused by gear formations 28 meshing with another gear will not be directly transmitted to the gear's drive shaft. Rather, the inwardly extending teeth 26 of the outer ring member 14 are isolated from the hub 12 by the elastomeric member 16. This elastomeric member 16 effectively isolates any vibrations which are developed by the gear formations 28 from reaching the drive shaft. Furthermore, the purpose of the overlapping arm/tooth configuration is to make sure that the loads transmitted through the gear 10 put the elastomeric member 16 in compression rather than shear. Since the elastomeric material is relatively incompressible, the result is a low shear force on the adhesive bonds which hold the elastomeric material to both the inner hub 12 and the outer ring member 14.

It can thus be seen that the instant invention provides an effective quiet gear construction 10 which is particularly useful in high-torque applications. The elastomeric member 16 effectively absorbs and reduces vibrations transmitted through the gear construction, while the intermeshing arm/tooth configuration reduce shear loads which routinely cause failure in the prior art constructions. For these reasons, the instant invention is believed to represent a significant improvement in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A high-torque quiet gear construction comprising:

an inner hub having an axis of rotation and having a plurality of circumferentially spaced arms extending radially outwardly therefrom, each said arm being rectangular in configuration and having two parallel faces positioned on either side of a radius of said inner hub;

an outer ring member having a plurality of circumferentially spaced elongated teeth extending radially inwardly therefrom, each said tooth having a face positioned on either side of a radius of said ring member, each tooth face being oriented in parallel with a corresponding arm face on said inner hub, said teeth being received in closely spaced facing relation in corresponding spaces formed between adjacent arms of the hub, and said outer ring member further having a plurality of gear formations on an outer surface thereof; and a relatively incompressible elastomeric member received in the space formed between said side surfaces of said arms and said teeth so as to form a resilient connection between said hub and said member, said intermeshing arrangement of said side surfaces of said arms and said teeth operating to substantially place said elastomeric element in compression and reduce shearing forces between mating surfaces of said hub, said outer ring member and said elastomeric member.

2. The high-torque quiet gear construction of claim 1 further comprising means for receiving a drive shaft along the axis of rotation of the hub and further comprising means for securing said hub to said drive shaft.

3. The high-torque quiet gear construction of claim 2 wherein said means for securing said hub to said drive shaft comprises spline teeth.

* * * * *